United States Patent [19]
Eastes

[11] 4,233,051
[45] Nov. 11, 1980

[54] METHOD FOR PRODUCING CALCIUM BORATES

[75] Inventor: Walter L. Eastes, Granville, Ohio

[73] Assignee: Owens-Corning Fiberglas Corporation, Toledo, Ohio

[21] Appl. No.: 47,521

[22] Filed: Jun. 11, 1979

[51] Int. Cl.³ .......................... C03C 13/00; C03C 3/14
[52] U.S. Cl. ............................... 65/134; 106/DIG. 8; 423/287; 423/279; 423/280
[58] Field of Search .......................... 65/27, 134, 335; 106/DIG. 8; 423/287, 279, 280

[56] References Cited

U.S. PATENT DOCUMENTS

| | | | |
|---|---|---|---|
| 999,497 | 8/1911 | Gruter | 423/280 |
| 3,032,391 | 5/1962 | Ball et al. | 423/280 |
| 3,032,392 | 5/1962 | Nies et al. | 423/280 |
| 4,074,991 | 2/1978 | Brzozowski et al. | 65/134 X |

FOREIGN PATENT DOCUMENTS 51-71300 12/1974 Japan ........................ 423/279
859344 1/1961 United Kingdom .

OTHER PUBLICATIONS

Kirk-Othmer, "Encyclopedia of Chemical Technology", 2nd Edition vol. 3, pp. 649 & 650.
"A Comprehensive Treatise on Inorganic+Theoretical Chemistry", J. W. Mellor (Longmans, Green, N.Y. 1929) vol. V., pp. 85-95.
"Metallo Boron Compounds & Borates", N. P. Nies, G. W. Campbell, R. W. Adams (Interscience, N.Y., 1964. pp. 92 and following.

Primary Examiner—Arthur D. Kellogg
Attorney, Agent, or Firm—Ronald C. Hudgens; Patrick P. Pacella

[57] ABSTRACT

A method of precipitating calcium borates from an aqueous mixture of calcium chloride and borax is disclosed. The yield of calcium borate precipitates can be increased by increasing the concentration of borax. Preferably, an increase in the calcium concentration also is employed. In general, it was found that properties of compacted glass batch produced from these calcium borates compare favorably with those compacted from standard glass batches.

11 Claims, 3 Drawing Figures

METHOD FOR PRODUCING CALCIUM BORATES

TECHNICAL FIELD

This invention relates to a process for producing calcium borates having particularly useful properties. Among these properties are a relatively high percentage of $B_2O_3$, a relatively low percentage or complete absence of $Na_2O$ and an unusually low water content.

BACKGROUND ART

Many industrial processes, of which glass making is illustrative, require appreciable quantities of $B_2O_3$ as an ingredient in a composition that is to be melted at relatively high temperatures in a furnace. The $B_2O_3$ may be supplied by many different borate compounds. The following is a list of some of the more readily available borate compounds:

| Mineral or Chemical Name | Chemical Formula |
| --- | --- |
| Boric acid | $H_3BO_3$ |
| Anhydrous boric acid | $B_2O_3$ |
| Anhydrous borax | $Na_2O \cdot 2B_2O_3$ |
| 5 Mol borax | $Na_2O \cdot 2B_2O_3 \cdot 5H_2O$ |
| Borax | $Na_2O \cdot 2B_2O_3 \cdot 10H_2O$ |
| Dehydrated Rasorite | $Na_2O \cdot 2B_2O_3$ |
| Probertite | $Na_2O \cdot 2CaO \cdot 5B_2O_3 \cdot 10H_2O$ |
| Ulexite | $Na_2 2CaO \cdot 5B_2O_3 \cdot 16H_2O$ |
| Colemanite | $2CaO \cdot 3B_2O_3 \cdot 5H_2O$ |
| Calcined colemanite | $2CaO \cdot 3B_2O_3 \cdot H_2O$ |
| Sodium Perborate | $NaBO_2 \cdot H_2O_2 \cdot 3H_2O$ |

Because of the disadvantages of relatively large amounts of water or soda in many of these compounds, a large potential demand for pure calcium borates exists. Ulexite, colemanite and especially calcined colemanite are desirable for glass making processes particularly where compacting glass batch is employed.

DISCLOSURE OF INVENTION

According to this invention, calcium borates are precipitated from an aqueous mixture of calcium chloride and borax.

This method of precipitating calcium borate from solutions of borax and calcium chloride is becoming more desirable with the increasing use of compacting glass batch in the glass industry. Sources of boron other than ulexite and calcined colemanite now used in compacting glass batch will be necessary in order to avoid dependence upon a single boron source. Borax, boric acid and anhydrous boric acid (or boric oxide) are unacceptable in some compacting systems because they dissolve in water or decrepitate when compacted and preheated. In other cases, the cost of the calcined product is prohibitive.

Both borax and calcium chloride are very soluble in water. When solutions of the two are mixed, a voluminous, finely divided white precipitate is formed. The precipitate is somewhat difficult to filter, being so fine, but becomes less so upon standing or on heating. The product is amorphous and contains about 50% water.

I have discovered a way of increasing the yield of calcium borate. My discovery lies in increasing the concentration of borax in the original solution. Accompanied by an increase in the concentration of calcium, an increase in the yield of precipitation is achieved. As will be demonstrated by the following examples, the yield of precipitate levels increases to a particular point where higher concentrations of borax fail to give substantially higher yields of precipitate.

The reaction of borax with the calcium chloride in water solution according to this invention is as follows:

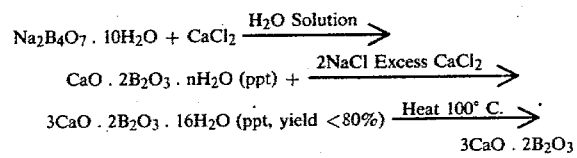

If a great excess of calcium chloride is added to the solution in an attempt to precipitate as much borate as possible, the original precipitate redissolves. This effect limits the amount of original borax which can be converted into calcium borate by the process. If too much calcium chloride is added, the calcium borate goes back into the solution; if too little is added, not all the borax is precipitated. Accordingly, my invention lies in the discovery of the critical concentrations of materials employed to yield the maximum amount of calcium borate.

Other halides that are highly soluble in water can be employed in this invention. Calcium iodide and calcium bromide which are highly soluble in water, are included within the scope of this invention.

Calcium fluoride, on the other hand, is very insoluble in water and would not be included. Other halide salts which are included are those of aluminum, magnesium, barium and the like.

Generally, the calcium chloride (or halide) calculated as $CaO$ (or the corresponding oxide) and the borax calculated as $B_2O_3$ are present in the initial amounts having a molar ratio of $CaO/B_2O_3$ ranging from 0.2 to 0.6. Preferably, the ratio of $CaO/B_2O_3$ ranges from 0.3 to 0.5.

In general, it was found that properties of compacted glass batch produced from these calcium borates compare favorably with those compacted from standard glass batches. In order to be useful for glass batch compacting, the calcium borate must first be dried at about 100° C. for an hour to remove loosely bound water. The small amount of remaining water will not be expected to affect the compacting process.

In order to further investigate this reaction and to optimize a yield, a method of titration was developed. To a solution of borax of known concentration, an increment of a concentated calcium chloride solution is added, which causes a calcium borate to precipitate. A small amount of the solution containing no precipitate is extracted and analyzed for boron. In this way, the remaining borate in solution is measured at each step, from which one may compute the amount in the precipitate.

BRIEF DESCRIPTION OF THE DRAWINGS

In FIGS. 1 and 2, the circles are the measurements and straight lines are drawn between them. All amounts are molar quantities and are related to the initial borax expressed as $B_2O_3$. In addition, the calcium added is expressed as $CaO$. The titration in FIG. 1 was done at an initial borax concentration of 0.1 M $Na_2B_4O_7$. The tiltration in FIG. 2 was done at an initial borax concentration of 0.5 M $Na_2B_4O_7$. The solubility of calcium borate in FIG. 3 was measured as a function of temperature.

BEST MODE OF CARRYING OUT INVENTION

Figure 1:
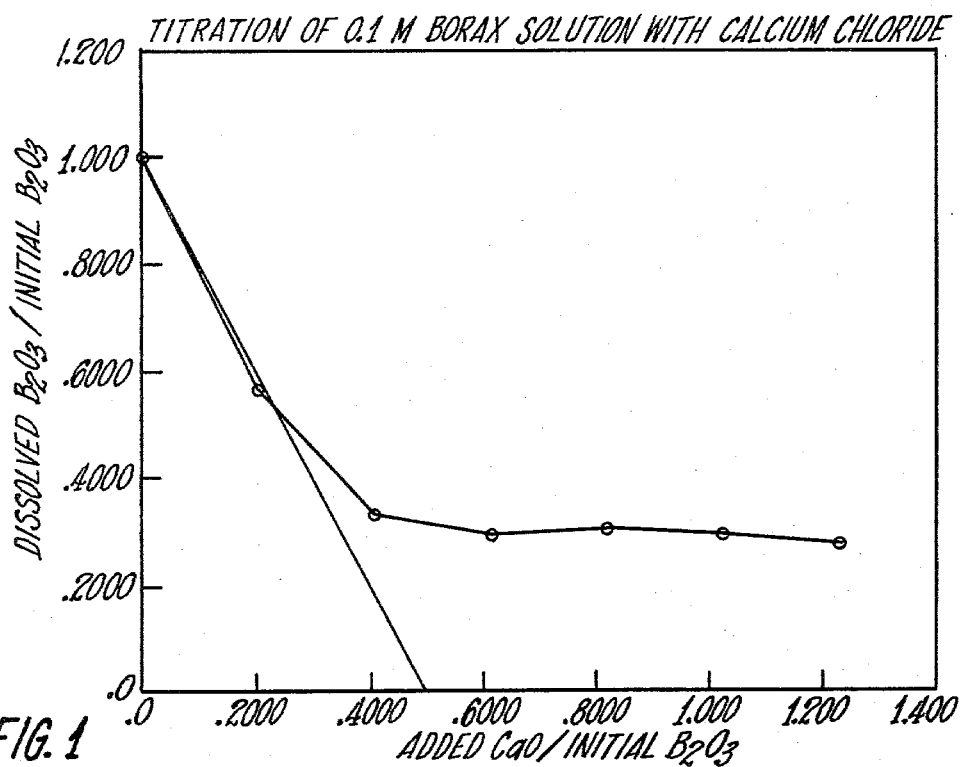
FIGS. 1 and 2 are titration curves.

As $CaCl_2$ is added to the borax solution, the amount of borate in solution decreases sharply and then levels off. As calcium is added to the solution, at first nearly all of it is precipitated as calcium borate. Therefore, the initial slope of the titration curve gives the composition of the first precipitate. From FIG. 1, the slanted straight line shows that CaO and $B_2O_3$ are precipitated at the ratio of 1:2, or a composition of $CaB_4O_7$ (or $CaO.2B_2O_3$). Past a certain point, however, no borax is precipitated. The maximum yield of precipitate obtained from the amount of $B_2O_3$ left in solution is 70% (1−0.3) in the case of FIG. 1. This yield occurs at a ratio of added CaO to initial $B_2O_3$ of about 0.35 and the product precipitated is $CaB_4O_7$.

Figure 2:
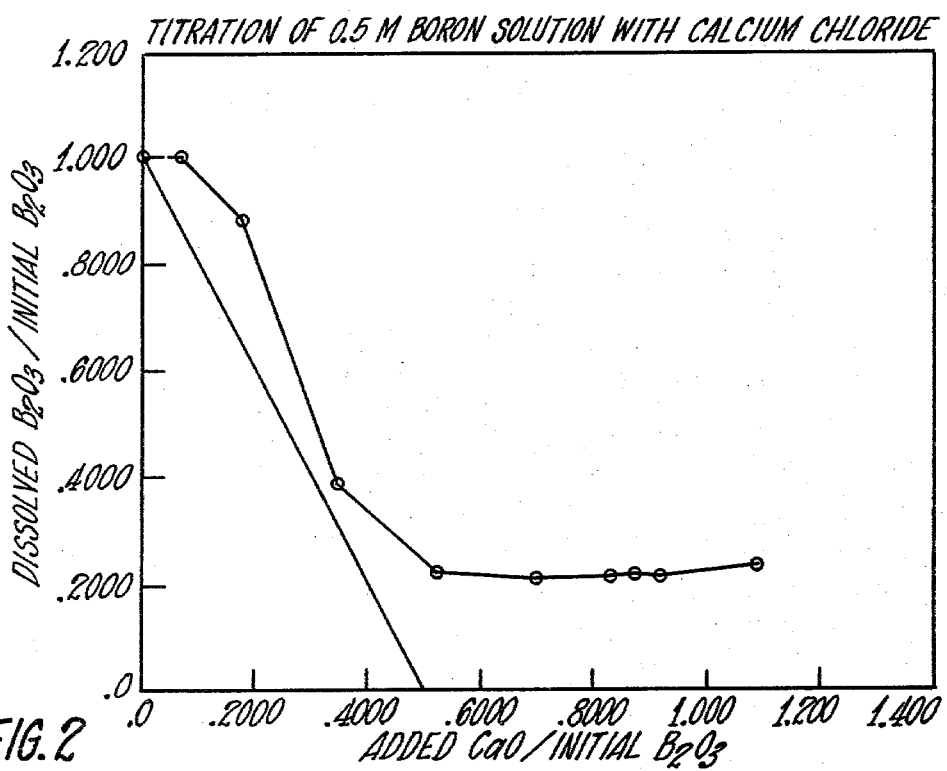

The yield of borate may be increased if higher concentrations of borax are used. The titration curve in FIG. 2 is the same as that in FIG. 1, but done at an initial borax concentration of 0.5 M $Na_2B_4O_7$. This curve also shows an initial slope approximately corresponding to a preipitate of $CaB_4O_7$. The curve levels off at a precipitate yield of about 78% (1.0−0.22). Somewhat higher concentrations of borax were tried but failed to give substantially higher yields than this.

According to this invention, the best yield of borates is given by an initial concentration of 0.5 M borax to which is added an amount of calcium chloride solution to give an added CaO/initial $B_2O_3$ ratio of 0.5.

For the intended use of the calcium borate in compacting glass batch, the solubility in water is of interest. It is desirable that the solublity not increase significantly with temperature since the temperature changes during compacting and predrying of glass batch would likely lead to an undesirable dissolution and reprecipitation cycle. The following results show that all of the calcium borates are virtually insoluble in water and that their solubility is nearly independent of temperature.

The solubility in pure water of a series of calcium borates was measured at various tempertures from 20° C. to 70° C. using the method given in Example IV. Measurements were made not only on the calcium borates produced by the precipitation of this invention, but also on a series of calcium borates produced by other means.

Figure 3:
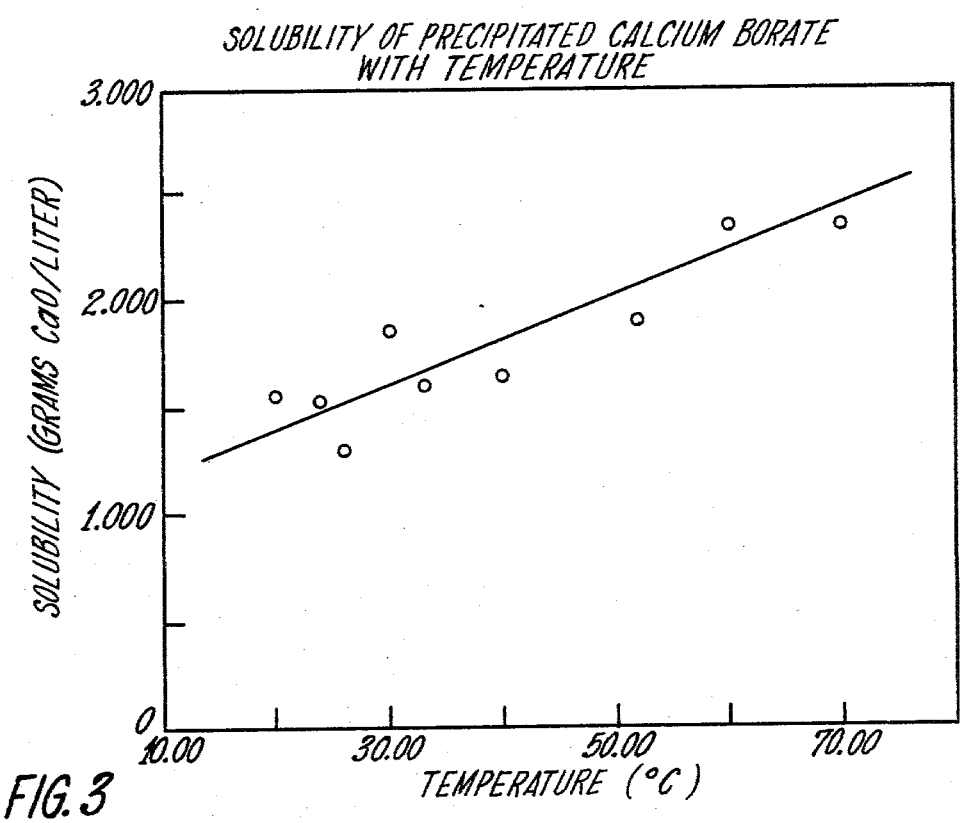
FIG. 3 is a solubility curve.

The solubility of calcium borates precipitated from borax and calcium chloride is shown in FIG. 3 as a function of temperature. A straight line was drawn through the data points. From the data it can be seen that the solubility of the calcium borates is very low and is roughly constant over the entire temperature range. Accordingly, the calcium borates would be suitable for compacting glass batch from a solubility standpoint.

Methods are known in the art for glass manufacturing wherein glass-forming, batch ingredients are compacted into agglomerates and these agglomerates then are heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The pellets are discharged to a vertical bed contained within a chamber and furnace flue gases pass, in direct contact with and countercurrently to, downwardly moving pellets of the bed to dry and preheat them. The process is carried out at a temperature and for a time insufficient to fuse or melt substantial amounts of the agglomerates. The agglomerates usually will start to fuse together when their temperature reaches 1,400 or 1,500° F., so contact is discontinued at or below these temperatures.

EXAMPLE I

Procedure for the determination of calcium (1) Dissolve the sample in distilled water or in a few ml of dilute hydrochloric acid if necessary.

(2) Dilute to 50 ml; add 1 ml of buffer solution and 4 drops of indicator solution.

(3) Titrate with a standardized EDTA solution to a red to blue clor change.

The buffer solution mentioned here is prepared by dissolving about 7 grams of $NH_4Cl$ in 60 ml of concentrated $NH_4OH$ solution and diluting it in 100 ml of distilled water.

The EDTA solution is made by dissolving 18 grams of the disodium salt of ethylenediaminetetraacetic acid in somewhat less than 1000 ml of distilled water. Then 0.3 grams of $MgCl_2.6H_2O$ are dissolved in it and the solution is made up to 1000 ml.

The EDTA solution is standardized by dissolving accurately weighed 0.2 gram samples of dry $CaCO_3$ in a small amount of HCl solution. They are then titrated with the EDTA solution following the above procedure starting at step (2).

EXAMPLE II

Procedure for determination of boron

This procedure applies to the determination of boron in borate solutions or in borates which are soluble in water or in dilute acid. If the borate is already in solution, proceed to step (3).

(1) Accurately weigh a 0.2 gram sample of the borate to be determined.

(2) Add 2 ml of distilled water and 2 ml of 0.1 M HCl solution. Heat to dissolve. If it fails to dissolve, dilute to 100 ml and heat. In no case should the solution come to a boil.

(3) Dilute the solution to 100 ml if not already and insert the pH meter probes.

(4) Titrate with 0.1 M HCl to the sharp end point at pH 5.4. If the end point is overshot, titrate back with 0.1 M NaOH. The amounts of acid and base need not be recorded.

(5) Add several grams of mannitol and titrate with standardized 0.1 M NaOH to pH 6.8.

(6) When 6.8 is reached, add more mannitol, which usually causes the pH to drop.

(7) Continue to titrate to pH 6.8.

(8) Repeat steps (6) and (7) until the addition of mannitol does not change the pH.

(9) Record the volume of 0.1 M NaOH used in steps (5) through (8). Two moles of NaOH are equivalent to one mole of $B_2O_3$ in the original sample.

The 0.1 M HCl and NaOH are conveniently standardized by titrating an accurately weighed sample of dry $Na_2CO_3$ with the HCl and then by titrating the HCl and the NaOH with a pH meter.

EXAMPLE III

Method of titration of borate solutions with calcium chloride (1) Make up 100 ml of the required concentration of borax (or neutralized boric acid) in a 250 ml beaker.

(2) Extract exactly 1 ml (2 ml if under 0.1 M borax) by pipette and analyze this sample for boron by the method in Example II, starting at step (3).

(3) Add a measured increment of standardized $CaCl_2$ solution* by pipette or burette and stir.

\* The $CaCl_2$ solution may be standardized by analysis of a small portion for calcium as in Example I, starting at step (2).

(4) Fold a piece of filter paper into a cone and immerse the point about one inch below the surface of the solution.

(5) In a few minutes enough solution will filter through to enable 1 ml to be extracted by pipette.

(6) Analyze this sample for boron according to Example II or for calcium by Example I, starting at step (2).

(7) Push the filter paper to the bottom of the beaker and repeat steps (3) to (7) as required.

(8) Calculate the number of moles $B_2O_3$ (or CaO) left in the solution from the amount in the 1 ml sample and from the total volume of the solution from which it was taken. Note that the solution volume changes with the addition of $CaCl_2$ and removal of 1 ml samples.

EXAMPLE IV

Procedure for determining the solubility of a calcium borate

This method applies to the determination of the water solubility of slightly soluble or moderately soluble calcium compounds as long as the calcium content of the compound is known. More precisely, the method measures the amount of soluble calcium released by a dissolved borate. This quantity is known to be the property of interest in the production of agglomerates.

(1) With a constant temperature bath, bring about 200 ml of distilled water to the highest temperature at which the solubility is to be measured.

(2) Dissolve as much calcium borate as possible, leaving some excess lying in the beaker.

(3) When the solution has reached equilibrium (about 2 hours), extract exactly 10 ml by pipette and analyze for calcium by the method of Example I, starting at step (2).

(4) Lower the bath temperature to the next lower value desired.

(5) Repeat steps (3) and (4) as required to cover the temperature range.

The solubility of the calcium borate at each temperature may be calculated from the amount of calcium in the 10 ml sample.

I claim:

1. A method for producing calcium borates by precipitation from solution comprising an initial step of forming an aqueous solution of borax and calcium chloride wherein the calcium chloride calculated as CaO and the borax calculated as $B_2O_3$ are presented in initial amounts having a molar ratio of $CaO/B_2O_3$ ranging from 0.2 to 0.6.

2. A method according to claim 1 wherein the ratio of $CaO/B_2O_3$ ranges from 0.3 to 0.5.

3. A method according to claim 1 wherein the borax has an initial concentration ranging from 0.1 to 0.5 mole.

4. A method according to claim 3 wherein the borax had an initial concentration of 0.1 M and the ratio of $CaO/B_2O_3$ is 0.35.

5. A method according to claim 3 wherein the borax had an initial concentration of is 0.5 M and the ratio of $CaO/B_2O_3$ is 0.5.

6. A method for producing calcium borates by precipitation from solution comprising an initial step of forming an aqueous solution of borax oxide and a halide salt wherein the halide salt calculated as an oxide and the borax calculated as $B_2O_3$ are present in initial amounts having a ratio by weight of halide salt to $B_2O_3$ ranging from 0.2 to 0.6.

7. A method according to claim 6 wherein the borax has an initial concentration ranging from 0.1 to 0.5 M.

8. A method according to claim 1 wherein the calcium borates are subsequently dried at about 100° C. for an hour.

9. A method according to claim 8 wherein the calcium borates are subsequently heated to over 250° C.

10. A method for preparing a calcium borate-containing glass fiber forming glass batch comprising introducing calcium borate-containing batch ingredients into a compacting zone, compacting the ingredients with sufficient water to produce agglomerates containing 5% to 20% by weight of water, and heating the agglomerates to a temperature and for a time insufficient to melt or fuse the agglomerates, wherein the calcium borate is prepared by forming an aqueous solution of borax and calcium chloride wherein the calcium chloride calculated as CaO and the borax calculated as $B_2O_3$ are present in initial amounts having a molar ratio of $CaO/B_2O_3$ ranging from 0.2 to 0.6.

11. A process according to claim 10 including the subsequent step of charging the agglomerated glass batch to a glass melting furnace.

\* \* \* \* \*

UNITED STATES PATENT AND TRADEMARK OFFICE
CERTIFICATE OF CORRECTION

PATENT NO. : 4,233,051
DATED : November 11, 1980
INVENTOR(S) : Walter L. Eastes

It is certified that error appears in the above-identified patent and that said Letters Patent are hereby corrected as shown below:

Column 1, line 28: Ulexite $Na_2O \cdot 2CaO \cdot 5B_2O_3 \cdot 16H_2O$

Column 2, line 9: $CaO \cdot 2B_2O_3 \cdot nH_2O$ (ppt) + 2NaCl $\xrightarrow{\text{Excess } CaCl_2}$ Column 2, line 67: First word in line should be "titration"

Signed and Sealed this

Third Day of March 1981

[SEAL]

Attest:

RENE D. TEGTMEYER

Attesting Officer    Acting Commissioner of Patents and Trademarks